June 21, 1949.

A. A. MARKSON 2,473,717

PRESSURE TOTALIZING DEVICE

Filed June 22, 1944

INVENTOR.
Alfred A. Markson
BY Gerald B. Tjoflat
his attorney

Patented June 21, 1949

2,473,717

UNITED STATES PATENT OFFICE 2,473,717

PRESSURE TOTALIZING DEVICE

Alfred A. Markson, Mount Lebanon, Pa., assignor, by mesne assignments, to Hagan Corporation, Pittsburgh, Pa., a corporation of Pennsylvania Application June 22, 1944, Serial No. 541,645

3 Claims. (Cl. 73—405)

This invention relates to a system for totalizing fluid pressures or the sum or difference of a number of fluid pressures or of derived functions thereof.

Figure 1:
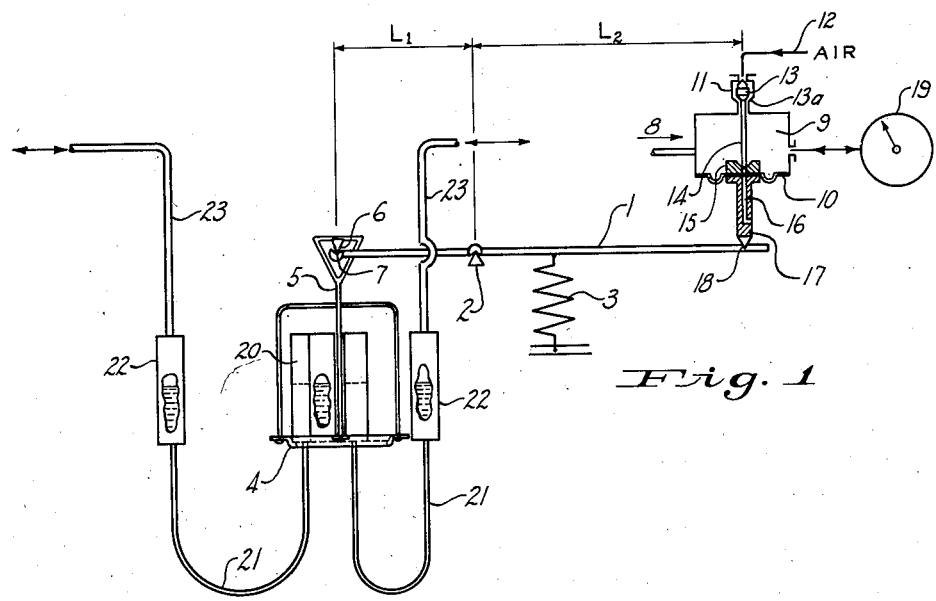
Figure 2:
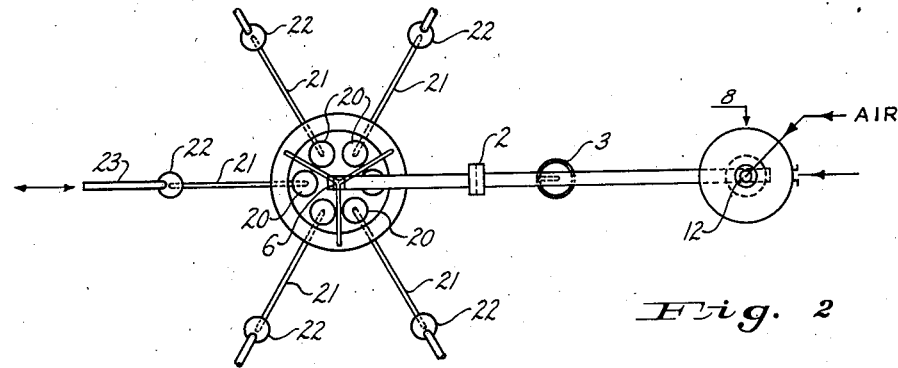

It is among the objects of the invention to provide a weighing system in which the fluid flows of fluid pressure control systems may be added, subtracted or multiplied. The invention will become more apparent from a consideration of the accompanying drawing constituting a part thereof, in which like reference characters designate like parts, and in which Fig. 1 is a diagrammatic view illustrating the fluid pressure measuring system;

Fig. 2 a top plan view thereof; and

Figure 3:
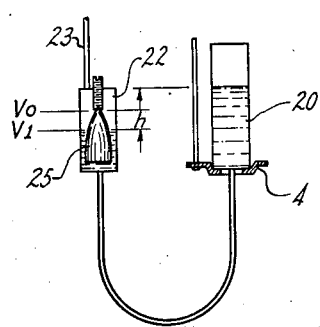

Fig. 3 a diagrammatic view showing a detail of the fluid pressure measuring device.

In the drawing numeral 1 designates a weigh beam fulcrumed at 2 and biased by a coil spring 3 to counteract the weight of the beam and to act as either a zeroizing or a bias spring. A weighing pan 4 is suspended by a link 5 from a fulcrum 6 that is mounted in a notch 7 at one end of the weigh beam 1. The weigh beam and its load is counteracted by a pneumatic balancer or operator 8 having an air chamber 9 closed at one end by a diaphragm 10 and communicating at its upper end with a valve chamber 11 leading to a source of air pressure designated by the arrow 12. A valve 13 having a stem 14 rests upon a lug 15 of diaphragm 10. The stem 14 also functions as a valve to control the escape of air through the orifice 16 of a fulcrum pin 17 that fits in a notch 18 of the weigh beam. An indicator 19 is connected to reflect the air pressures in the cylinder 9.

The fluid pressures are measured and totalized by means of a plurality of containers 20 mounted on the weigh pan 4 that are connected by flexible conduits 21 to fixed containers 22 which in turn are connected by conduits 23 to a source of positive or negative air pressure. The indicator 19 may be set at zero pressure when the system is used for totalizing positive pressures only, or it may be set to a specified pressure, such as 30 pounds, which would be maintained in the chamber 9 if negative pressures are to be measured and totalized. In either case, assuming that both positive and negative pressure impulses are transmitted from the source through conduits 23 to their respective containers 22, the positive pressures will displace the fluid of the chamber to which it is connected through the flexible conduit 21 to its corresponding container 20 on the weigh pan 4. Any negative pressures will correspondingly cause a displacement of fluid from its container on the weigh pan 4 to the outer container 22, and the total change in weight of the fluid in the containers 20 on the weigh pan 4 will cause a deflection of the weigh beam 1 in one direction or the other. Assuming the total pressures of the respective sources are greater than the zero for which the weigh beam is set, the arm $L_1$ will be deflected downwardly and $L_2$ lifted which, being in contact with the fulcrum member 17, will lift the latter to unseat valve 13 from its seat 13a, allowing pressure fluid from the source 12 to enter the chamber 9 until the beam 1 is balanced to the horizontal position and valve 13 again seats at 13a. The amount of fluid pressure thus admitted to the chamber 9 is reflected on the indicator 19 which is calibrated to give a direct reading of the quantity desired as determined by the total weight on the weigh pan 4.

If there is a decrease in the pressure fluids being weighed, lever arm $L_2$ will be deflected downwardly and fulcrum 17 which is attached to the diaphragm 10 will be lowered, as will also the diaphragm 10, to expand the volume of chamber 9 which causes a drop in the pressure reading of the gauge 19. If the downward movement of the fulcrum and diaphragm, 17 and 10 respectively, is sufficiently great to unseat the valve stem 14, the air from chamber 9 will vent through the passage 16 to the atmosphere until the pressure in chamber 9 corresponds to the actual weight on the weigh pan. When the pressure in chamber 9 and the weight on the weigh pan are in balance the device is in equilibrium.

In this manner both positive and negative totals are obtainable because in either case the balancer 8 always restores the weigh beam 1 to its neutral position. That is, if at the zero condition, the bias spring 3 is set to give a pressure output of 30 lbs. then the pressure range 30 to 60 lbs. might represent positive totals while 30 to zero might represent negative totals on the weigh pan.

A gain or loss of weight is therefore proportional to the displacement of the fluid in the containers 20 and 22, which is proportional to the pressure difference at the sources, which is therefore proportional to the change of registered air pressure.

To express this mathematically, let $\Delta P$ be the change of pressure on gauge 19, p. s. i.

$A$ be the area of the balancer diaphragm, sq. in.

$\Delta p$ be the change of applied pressure to chamber 22, p. s. i.

$\Delta V$ be the volume of fluid displaced by the change in pressure $\Delta p$, cu. in.

$d$ = the density of the displaced fluid, pound per cu. in.

Then neglecting the density of air, we may say, $$\Delta V \cdot d \sim (\text{varies as}) \Delta p$$
$$\Delta V \cdot d \cdot L_1 = \Delta P \cdot A \cdot L_2$$

or since everything is constant but $\Delta V$, $\Delta p$ and $\Delta P$, $$\Delta P = k \Delta p$$

For any number pairs of chambers such as 20 and 22, the same relation holds, so that we may say that for $n$ pairs of these chambers $$\Sigma \Delta p_n = \Sigma k \Delta P$$

This takes care of the straight pressure additions and subtractions. For other functions we may write, $$\Delta V \cdot d = f \Delta p$$

where $f \Delta p$ may be any function of $\Delta p$ such as $\Delta p^{\frac{1}{2}}$, log $\Delta p$ etc. This is accomplished by putting a shaped displacer 25 in the chamber 20 or 22 as in Fig. 3 so that the weight of fluid displaced from 22 into 20 varies as this desired function of $\Delta p$.

Supposing we wish to produce an air pressure which represents the product of $\Delta p_1$ and $\Delta p_2$. Into chambers 20 and 22 we put displacers such that $$\Delta V_1 \cdot d_1 = k_1 \log \Delta p_1$$

and $$\Delta V_2 d_1 = k_1 \log \Delta p_2$$

Then $$\Delta V_1 d_1 + \Delta V_2 d_1 = k_1 (\log \Delta p_1 + \log \Delta p_2)$$

but $$(\Delta V_1 d_1 + \Delta V_2 d_1) L_1 = \Delta P \cdot A \cdot L_2$$

Therefore, $$\frac{\Delta P A L_2}{L_1} = k_1 (\log \Delta p_1 + \log \Delta p_2)$$

and by making $$\frac{A L_2}{L_1} = k_1$$

$$\Delta P = \log \Delta p_1 + \log \Delta p_2$$

Therefore if the pressure gauge 19 has a log scale it will read the product of $\Delta p_1$ and $\Delta p_2$, etc.

From the foregoing description of the invention it is evident that the system of measuring or totalizing fluid pressures is simple and accurate and is useful for giving constant and direct readings of air fluid pressures in any fluid pressure system, including the total pressure of a plurality of fuel or air supply lines to industrial furnaces or the like in terms of direct or derived quantities.

Although one embodiment of the invention has been herein illustrated and described, it will be evident to those skilled in the art that various modifications may be made in the details of construction without departing from the principles herein set forth.

I claim:

1. The system of totalizing and subtracting fluid pressures comprising a weigh beam having a plurality of liquid containers supported on one end thereof and having a pneumatic balancer acting upon the beam at the other end thereof, fluid containers stationarily mounted and connected to said first named containers by a flexible conduit at the bottom of said containers to establish communication of the fluids in said containers, said second named containers having connection above the liquid level with sources of variable pressure, and a pressure gauge connected to said pneumatic balancer for indicating the total value of the pressure of said variable pressure sources.

2. A device for totalizing fluid pressures comprising a weigh beam mounted on a fulcrum and having a plurality of liquid receiving containers mounted on said beam at one side of said fulcrum and a pneumatic balancer comprising a cylinder having a diaphragm adapted for connection to a source of supply of compressed air of substantially constant pressure, said diaphragm having a thrust member acting on said weigh beam at the opposite side of said fulcrum from that which is acted upon by said fluid receiving containers, a valve in said cylinder and actuated by said diaphragm to control the admission of air pressure to said chamber when the diaphragm moves in one direction from a position of beam balance and to vent the cylinder to the atmosphere when the diaphragm moves in the opposite direction from said position of beam balance, and a plurality of containers stationarily and independently mounted with respect to said beam-mounted liquid receiving containers, each of said stationarily mounted containers being connected by flexible tubing to a liquid receiving container on said beam, a liquid in said stationary containers, means for applying different pressures to the respective stationary containers whereby liquid may be reversibly displaced from the several stationary containers to the liquid receiving chambers in response to variations in pressure, whereby the weigh beam is unbalanced by changes in total weight of liquid acting on said beam and whereby the pressure acting on said pneumatic balancing diaphragm is caused to be adjusted to a value at which the beam is restored to its balanced position and a pressure gauge connected to said pneumatic balancer to indicate by the value of pressure therein the total value of the pressures supplied to the respective stationary containers.

3. A device for algebraically totalizing a plurality of fluid pressures comprising a weigh beam mounted on a fulcrum, a plurality of liquid receiving members suspended from said beam at one side of said fulcrum, a pneumatic balancer mounted to act on said beam at the other side of said fulcrum, said balancer having a valve disposed to be actuated thereby for controlling the admission and exhaust of a fluid pressure to and from said balancer in response to the development of an unbalance between the total weight of liquid in said fluid chambers and the force exerted by said balancer on said beam, a plurality of chambers supported independently of said weigh beam, flexible tubing connecting each of said latter chambers to a fluid receiving chamber suspended from said weigh beam, whereby displacement of fluid between the several independently mounted chambers and said weigh beam liquid receiving chambers may be effected in response to variable pressures being applied to said independently mounted chambers and whereby said valve is actuated to develop a pressure in said balancer that will restore said weigh beam to a condition of balance with the total weight of liquid in the chambers suspended from said weigh beam and a pressure gauge connected to said pneumatic balancer to indicate by the value of pressure therein the total value of the pressures supplied to the respective stationary containers.

ALFRED A. MARKSON.

(References on following page)

REFERENCES CITED

The following references are of record in the file of this patent:

UNITED STATES PATENTS

| Number | Name | Date |
|---|---|---|
| 703,753 | Arndt | July 1, 1902 |
| 751,296 | Jones | Feb. 2, 1904 |
| 1,638,101 | Roucka | Aug. 9, 1927 |
| 2,223,712 | Ziebolz | Dec. 3, 1940 |
| 2,257,577 | Rosenberger | Sept. 30, 1941 |
| 2,354,423 | Rosenberger | July 25, 1944 |

FOREIGN PATENTS

| Number | Country | Date |
|---|---|---|
| 437,292 | Great Britain | Oct. 28, 1935 |
| 583,401 | France | Oct. 30, 1924 |
| 611,179 | Germany | Mar. 23, 1925 |